United States Patent [19]

Sekmakas

[11] 4,144,220
[45] Mar. 13, 1979

[54] HIGH SOLIDS COATING COMPOSITIONS AND PRODUCTION THEREOF

[75] Inventor: Kazys Sekmakas, Chicago, Ill.

[73] Assignee: DeSoto, Inc., Des Plaines, Ill.

[21] Appl. No.: 626,865

[22] Filed: Oct. 29, 1975

[51] Int. Cl.$^2$ .................. C08L 61/28; C08L 61/24
[52] U.S. Cl. .................. 260/33.2 R; 260/851; 260/855; 260/856
[58] Field of Search .......... 260/851, 856, 850, 33.2 R

[56] References Cited

U.S. PATENT DOCUMENTS

| 3,267,174 | 8/1966 | Fry et al. | 260/851 |
| 3,352,806 | 11/1967 | Hicks | 260/851 |
| 3,959,201 | 5/1976 | Chang | 260/850 |
| 3,959,202 | 5/1976 | Blank | 260/851 |

Primary Examiner—John C. Bleutge
Attorney, Agent, or Firm—Dressler, Goldsmith, Clement, Gordon & Shore, Ltd.

[57] ABSTRACT

Essentially solvent free resinous coating compositions are provided which are sufficiently fluid to permit effective application, and which cure on baking to provide chemically resistant flexible coatings. These are made by copolymerizing monoethylenic monomers including monoethylenic monomer having a functional group reactive with N-methylol functionality and selected from carboxylic acid, hydroxy and amide groups, the copolymerization being carried out in a solvent medium consisting essentially of liquid water insoluble trihydric alcohol having a molecular weight of at least 500. The copolymer solution in trihydric alcohol has added thereto an aminoplast resin to provide a stable solution in which proportions are important so that coatings can be easily applied and cured to provide hard, flexible, adherent, and corrosion resistant films without liberating large amounts of volatile material.

15 Claims, No Drawings

HIGH SOLIDS COATING COMPOSITIONS AND PRODUCTION THEREOF

The present invention relates to essentially solvent free resinous coating compositions which are sufficiently fluid to permit effective application and which cure on baking to provide hard, flexible, adherent, and chemically resistant coatings. Coatings which cure to provide excellent adhesion to metal and high gloss are particularly contemplated to provide a "nonvarnish" white which can be used on two part aluminum cans without any overprint varnish.

The art has previously attempted to provide 100% resin solids fluid coating compositions, but these have not been fully satisfactory from the standpoint of providing sufficiently fluid compositions which cure to form flexible chemically resistant coatings. Also, the prior art coatings have included resins formed by polymerization in inert organic solvents, and this has required removal of the solvent after polymerization, a difficult and uneconomic procedure. This prior art is illustrated by U.S. Pat. No. 3,267,174 dated Aug. 16, 1966, where the proportion of acrylic polymer is much greater than is employed herein resulting in unsatisfactory application properties when an effort is made to employ systems containing less than 10% of volatile component, especially less than 5% of volatile component. Also, and from the standpoint of chemical resistance, systems similar to those provided herein, but using water soluble polyols to provide water solution systems as in U.S. Pat. No. 3,352,806, have been formulated, but water insoluble polyols are required in the nonaqueous systems of this invention to provide the needed chemical resistance.

In this invention, monoethylenic monomers including from 5%–20% by weight of monoethylenic monomer having a functional group reactive with N-methylol functionality and selected from carboxylic acid, hydroxy and amide groups, are copolymerized in an organic solvent medium consisting essentially of water insoluble trihydric alcohol which is essentially nonvolatile at curing temperature, and which has a molecular weight of from about 500 up to about 5000 to provide a fluid solution of copolymer in the trihydric alcohol. Aminoplast resin is incorporated in the solution and this provides a liquid coating composition which is essentially solvent free and which is sufficiently fluid to permit easy coating application at room or slightly elevated temperature.

Proportions are important to this invention, and this requires a relatively small proportion of reactive copolymer and a relatively large proportion of water insoluble triol. More particularly, the reactive copolymers should constitute from 15–80% of the weight of the triol. Continuing with the proportions which should be used, the reactive copolymer should constitute from 4.5% to 30% of the mixture, the water insoluble triol will constitute from 30% to 60% of the mixture, and the balance of the mixture of the three components will consist essentially of aminoplast resin. At the same time, there must be at least 0.8 parts of aminoplast per part of reactive copolymer, preferably at least 1.5 parts per part of reactive copolymer.

Preferred proportions are 8%–25% of reactive copolymer combined with 32%–50% of the insoluble triol, and 25%–60% of the aminoplast resin, there being at least 2 parts of triol per part of reactive copolymer.

It is desired to point out that in this description, and also in the claims, all parts and proportions are by weight unless otherwise specifically noted.

The reactive copolymer and the triol are both coreactive with the N-methylol groups of the aminoplast resin, and cures take place at temperatures of 300° F. and higher. Since there is little or no volatile component, there are no large amounts of volatiles to be liberated during cure, and this avoids undesirable pollution of the atmosphere, and it also reduces cost and hazard.

It is stressed that use in sanitary cans is of particular importance and this demands coatings in which extractables are minimized, and in which water resistance and blush resistance are maximized. This means that both the triol and the reactive copolymer must be substantially free of salt groups in order to insure the water insolubility of these components and the subsequent water resistance of the cured coatings.

The nonreactive monoethylenic monomers which are combined with the reactive monomer in the reactive copolymer are subject to wide variation. Normally, monomers which provide hard homopolymers are relied upon to provide at least about 15% of the copolymer, these being especially illustrated by styrene and vinyl toluene, styrene being particularly preferred to maximize hardness and water resistance. Other hardening monomers less desirably present are methyl methacrylate, acrylonitrile, and vinyl acetate. Monomers providing soft homopolymers are also desirably included in amounts of at least 40% of the copolymer. These are illustrated by ethyl acrylate, n-butyl acrylate, isobutyl acrylate, 2-ethylhexyl acrylate and similar alkyl esters of monoethylenic carboxylic acids. Isobutyl acrylate in an amount of from 45%–70% is particularly preferred. The specific nature of the monoethylenic monomers constituting the balance of the acid copolymer is of secondary significance to this invention. In preferred practice, the nonreactive monoethylenic monomers contain the single ethylenic group as the sole functional group thereof, and constitute at least 75% of the copolymer and, more preferably, the entire balance of the copolymer, except for the reactive monomer.

The reactive monomers may be of several types which may be used alone or in admixture with one another. Monoethylenic carboxylic acid monomers are preferred, but other reactive monoethylenic monomers may be used such as amide monomers, such as acrylamide or methacrylamide, or a hydroxy functional monomer such as hydroxy ethyl acrylate or methacrylate. Hydroxy or carboxy functional polyesters may also be included in small amount as taught in my prior U.S. Pat. No. 3,163,615.

The preferred carboxylic monomers are illustrated by acrylic acid, methacrylic acid, crotonic acid, monobutyl fumarate, and the like. The reactive monomers will include the reactive groups noted, but no other reactive group.

The aminoplast resins constitute a conventional class of heat hardening condensates of polyamines with formaldehyde, and ethers thereof. Urea-formaldehyde, melamine-formaldehyde, and benzoguanamine-formaldehyde will illustrate this class of materials. Since fluidity at room temperature is a feature of the invention, liquid methyl ethers are preferred, such as hexamethoxy methyl melamine.

The water insoluble trihydric alcohol having a molecular weight in the range of 500–5000 can vary considerably so long as it is essentially nonvolatile at curing conditions in the range of 300°–500° F. This allows the trihydric alcohol to react with the aminoplast resin without evaporation. The preferred trihydric alcohols are polyethers or polyesters, and it is most preferred to employ trihydric alcohols which are liquid at room temperature since this minimizes the proportion of volatile organic solvent which is required to provide the fluidity needed for coating at room or moderately elevated temperature.

Polyethers are quite satisfactory for use herein, these being conveniently formed by adducting a monoepoxide, such as propylene oxide, or butylene oxide, with a trihydric alcohol of low molecular weight, such as glycerin or trimethylol propane.

Polyesters are also useful, such as those produced by reacting a lactone, such as epsilon caprolactone, with a trihydric alcohol, such as those listed in the preceding paragraph.

Aliphatic trihydric alcohols are particularly preferred.

While minor amounts of dihydric or tetrahydric alcohols may be present in admixture with the water insoluble trihydric alcohols which are essential, these dihydric or tetrahydric alcohols are preferably absent. Using dihydric alcohols, the coatings are too soft, and cure is inadequate. Using an excessive proportion of tetrahydric alcohol leads to cured products which are excessively brittle.

While volatile organic solvents are preferably completely absent, small amounts thereof may be present to reduce viscosity, but these would normally be added to the final product so that whatever final viscosity is desired can be obtained at the time of application. This small amount of solvent would evaporate during the cure and would therefore provide some limited pollution which it is desired to avoid. Nonetheless, up to 20% of volatile organic solvent may be present for viscosity adjustment, though in the preferred practice of this invention, the volatile organic solvent content would be less than 10%, most preferably less than 5%. The most preferred products contain less than 1% of volatile solvent.

The copolymerization is carried out by heating the mixture of monomers and polyhydric alcohol in the presence of a free radical generating catalyst, such as a peroxide or equivalent catalyst, such as azobisisobutyronitrile. Suitable temperatures for copolymerization may vary from 60°–200° C., preferably from 80°–150° C.

The invention is illustrated in the following examples.

EXAMPLE 1

Preparation of High Solids Acrylic Resin

1500 Polyoxypropylene triol (average molecular weight 730, hydroxyl number 232, milligrams KOH per gram)*
heat to 120° C. with agitation.
200 Styrene
370 Isobutyl acrylate
60 Acrylic acid
15 Benzoyl peroxide
10 Tertiary dodecyl mercaptan
   Premix monomers, catalyst and chain terminator, and add to reactor over 3 hours at 120° C. Hold for one hour.
* Pluracol TP-740 may be used as the water insoluble triol.
5 Tertiary butylperbenzoate Add catalyst. Hold for two hours. Cool to 70° C.
1300 Hexamethoxy methyl melamine
   Add hexamethoxymethyl melamine slowly at 70° C. and then cool to 30° C. to provide a mixture having the following final characteristics:

| Solids: | 100% |
| Viscosity (Gardner) | Y-Z |
| Color (Gardner-Holdt) | 1 |
| Acid Value | 13.6 |

EXAMPLE 2

Preparation of Pigmented White Coatings for Containers Utilizing High Solids Acrylic Resin of Example 1

A high solids white pigmented coating was prepared utilizing the following procedure.
200 parts — Product of Example 1
406 parts — Titanium dioxide
Grind the above in a sand mill to a fineness reading of 7 on the North-Shore scale. Then add:
334.2 parts — Product of Example 1
8.2 parts — Silicone surfactant *
250.0 parts — Polyoxypropylene triol (same as in Example 1) 1,198.4 — Total charge The viscosity of the pigmented high solids coating is 128 seconds on No. 4 Ford Viscosity Cup at 77° F. and it weighed 11.75 pounds per gallon.
* low molecular weight methyl silicone oil (General Electric Product SF 1066 may be used).

The prepared coating was applied with a roller coater on aluminum and tin free panels, and exhibited excellent flow and leveling properties.

The panels were cured in an electric oven for 10 minutes at 365° F. The cured films had good gloss, adhesion, and flexibility properties.

A clear film of the acrylic resin of Example 1 was applied over the white base coat as a clear overprint varnish. It also exhibited very good flow and intercoat adhesion properties after curing the film for 7 minutes at 365° F.

Examples 1 and 2 are repeated replacing the 60 parts of acrylic acid used in Example 1 with a corresponding weight of 2-hydroxy ethyl acrylate in one instance, and acrylamide in a second instance. Corresponding results are obtained, but the use of the unsaturated acid is preferred because it leads to more rapid cure and greater film hardness and mar resistance.

The invention is defined in the claims which follow.
I claim:

1. A fluid resinous coating composition essentially free of volatile solvent and which cures on baking to provide high gloss coatings which are strongly adherent to metal substrates, said coating composition consisting essentially of a mixture of:
   (1) copolymer of monoethylenic monomers including from 5–20% of monoethylenic monomer having a functional group reactive with the N-methylol group and selected from carboxylic acid, hydroxy, and amide groups, said copolymer being produced by copolymerization in an organic solvent medium consisting essentially of component (2) below;
   (2) water insoluble trihydric alcohol which is essentially nonvolatile at curing temperature and which has a molecular weight of from about 500 up to about 5000, said copolymer being dissolved in said trihydric alcohol; and (3) an aminoplast resin; said copolymer constituting from 4.5% to 30% of the mixture, the water insoluble trihydric alcohol constituting from 30%-60% of the mixture, and the balance of the mixture of the three components consisting essentially of aminoplast resin, there being at least 0.8 parts of aminoplast resin per part of copolymer, sand said copolymer being present in an amount of from 15-80% of the weight of the trihydric alcohol.

2. A coating composition as recited in claim 1 in which the copolymer is present in an amount of 8%-25%, the water insoluble trihydric alcohol is present in an amount of from 32%-50%, and the aminoplast resin is present in an amount of from 25%-60%, there being at least 2 parts of trihydric alcohol per part of copolymer.

3. A coating composition as recited in claim 1 in which at least 15% of the copolymer is constituted by styrene or vinyl toluene.

4. A coating composition as recited in claim 1 in which at least 75% of the copolymer is constituted by nonreactive monoethylenic monomers containing the single ethylenic group as the sole functional group thereof.

5. A coating composition as recited in claim 1 in which at least 40% of the copolymer is selected from styrene, vinyl toluene, methyl methacrylate, acrylonitrile and vinyl acetate, and the balance of the copolymer, except for the reactive monomer, consists essentially of alkyl esters of monoethylenic carboxylic acid.

6. A coating composition as recited in claim 5 in which said copolymer includes from 45%-70% of isobutyl acrylate.

7. A coating composition as recited in claim 1 in which said aminoplst resin is present in the form of a liquid methyl ether.

8. A coating composition as recited in claim 7 in which said aminoplast resin is heamethoxymethyl melamine.

9. A coating composition as recited in claim 1 in which said water insoluble trihydric alcohol is a polyether.

10. A coating composition as recited in claim 7 in which said water insoluble trihydric alcohol is a polyether formed by adducting propylene oxide with a trihydric alcohol selected from glycerin and trimethylol propane.

11. A coating composition as recited in claim 1 in which said water insoluble trihydric alcohol is a polyester.

12. A coating composition as recited in claim 11 in which said water insoluble trihydric alcohol is a polyester formed by reacting epsilon caprolactone with a trihydric alcohol selected from glycerin and trimethylol propane.

13. A coating composition as recited in claim 1 containing less than 5% of volatile organic solvent.

14. A coating composition as recited in claim 1 containing less than 1% of volatile organic solvent.

15. A coating composition as recited in claim 1 in which said reactive monomer consists of monoethylenic carboxylic acid.

* * * * *